(12) United States Patent
Chandra et al.

(10) Patent No.: US 10,186,022 B2
(45) Date of Patent: *Jan. 22, 2019

(54) SYSTEM AND METHOD FOR ADAPTIVE PIXEL FILTERING

(71) Applicants: STMicroelectronics International N.V., Amsterdam (NL); STMicroelectronics SA, Montrouge (FR)

(72) Inventors: Mahesh Chandra, Ghaziabad (IN); Antoine Drouot, Paris (FR)

(73) Assignees: STMicroelectronics SA, Montrouge (FR); STMicroelectronics International N.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,294

(22) Filed: Jun. 28, 2017

(65) Prior Publication Data

US 2017/0301072 A1   Oct. 19, 2017

Related U.S. Application Data

(63) Continuation of application No. 14/983,150, filed on Dec. 29, 2015, now Pat. No. 9,710,722.

(51) Int. Cl.
| | |
|---|---|
| *G06T 5/20* | (2006.01) |
| *G06T 11/60* | (2006.01) |
| *G06T 5/00* | (2006.01) |
| *G06K 9/46* | (2006.01) |
| *G06K 9/56* | (2006.01) |

(52) U.S. Cl.
CPC .............. *G06T 5/20* (2013.01); *G06K 9/4604* (2013.01); *G06K 9/4671* (2013.01); *G06K 9/56* (2013.01); *G06T 5/002* (2013.01); *G06T 11/60* (2013.01); *G06T 2207/10016* (2013.01)

(58) Field of Classification Search
CPC .......................... G06K 9/4671; G06K 9/4604
See application file for complete search history.

(56) References Cited

U.S. PATENT DOCUMENTS

| | | | |
|---|---|---|---|
| 6,108,455 A | 8/2000 | Mancuso | |
| 8,907,973 B2 | 12/2014 | Manchi | |
| 9,432,596 B2 * | 8/2016 | Sasaki | ..................... H04N 5/357 |
| 2008/0309955 A1 * | 12/2008 | Lee | ..................... H04N 1/4056 |
| | | | 358/1.9 |

(Continued)

*Primary Examiner* — David F Dunphy
(74) *Attorney, Agent, or Firm* — Seed IP Law Group LLP

(57) ABSTRACT

Various embodiments provide an optimized image filter. The optimized image and video obtains an input image and selects a target pixel for modification. Difference values are then determined between the selected target pixel and each reference pixel of a search area. Subsequently, a weighting function is used to determine weight values for each of the reference pixels of the search area based on their respective difference value. The selected target pixel is then modified by the optimized image filter using the determined weight values. A new target pixel in an apply patch is then selected for modification. The new target pixel is modified using the previously determined weight values reassigned to a new set of reference pixels. The previously determined weight values are reassigned to the new set of reference pixels based on each of the new set of reference pixels' position relative to the new target pixel.

14 Claims, 7 Drawing Sheets

(56) References Cited

U.S. PATENT DOCUMENTS

| | | | |
|---|---|---|---|
| 2010/0091846 A1* | 4/2010 | Suzuki | H04N 19/105 375/240.12 |
| 2011/0063517 A1* | 3/2011 | Luo | H04N 9/78 348/663 |
| 2012/0027319 A1* | 2/2012 | Hu | H04N 1/409 382/275 |
| 2017/0039444 A1* | 2/2017 | Li | G06K 9/4604 |

* cited by examiner

SYSTEM AND METHOD FOR ADAPTIVE PIXEL FILTERING

BACKGROUND

Technical Field

The present disclosure generally relates to filter optimization. In particular, the present disclosure is directed to an optimized image filter having a weighting function that depends on neighboring pixel values.

Description of the Related Art

With the improvement of display devices, such as televisions, computers, tablets, and smartphones, there is a large demand for high quality images and video. Digital image processing is often used to improve the quality of images and video. For example, image filters are used to digitally reduce noise present in images and video. See U.S. Pat. No. 6,108,455 filed May 29, 1998 and entitled "Non-linear Image Filter for Filtering Noise."

A common noise reduction filter is a finite impulse response (FIR) filter. An adaptive FIR filter's convolution kernel (matrix of pixels) may be defined by equation (1):

$$pix_{out}(i) = \frac{1}{N(i)} \sum_{j \in \Omega} w(i, j) \times pix_{in}(j) \quad (1)$$

where i and j are 2D coordinate vectors; i represents coordinates of a target pixel that is to be processed; j represents coordinates of a reference pixel; $pix_{in}(j)$ are input pixel values in the kernel; $pix_{out}(i)$ is a filtered value of $pix_{in}(i)$; w(i,j) is a weighting function; N(i) is the normalization factor: $N(i) = \Sigma_{j \in \Omega} w(i, j)$; and $\Omega$ is a search area of an image, which is typically a square kernel of pixels centered on the target pixel.

In general, the filter of equation (1) is a weighted average of surrounding pixels. The weighting function w(i,j) for the filter of equation (1) can be computed in a plurality of ways. For example, the weighting function w(i,j) for a bilateral or sigma filter is a product of spatial weights and a photonic (or range) weights. The weighting function w(i,j) for a bilateral filter may be defined by equation (2):

$$w_{bilateral}(i,j) = f(\|i,j\|) \times g(|pix_{in}(i) - pix_{in}(j)|) \quad (2)$$

where f( ) and g( ) are, ideally, continuous and monotonous decreasing functions, such as a Gaussian curve; and $\|i,j\|$ designates a Euclidean distance between the spatial positions of pixels i and j.

Another common filter for noise reduction is a non-local filter. For a non-local filter, the weighting function w(i,j) is dependent upon a difference between patches p of pixels centered on target and reference pixels. A patch, as used herein, refers to a subset of pixels. The weighting function w(i,j) for a non-local filter may be defined by equation (3):

$$w_{non-local}(i,j) = g(\sqrt{\Sigma_{k \in p(i), l \in p(j)}(pix_{in}(k) - pix_{in}(l))^2}) \quad (3)$$

The image filters described above are well known in the art and will not be discussed in detail in this description.

BRIEF SUMMARY

In accordance with an embodiment of the present disclosure, an optimized image filter is provided. The optimized image filter obtains an input image and selects a first target pixel for modification within a search area (a first subset of pixels of the image). In one filtering method, a sum of absolute differences (SAD) values are then determined between the selected first target pixel and each reference pixel of a search area. The SAD values are computed from a second subset of pixels that is within the search area with a third subset of pixels within the search area. The second subset of pixels being associated with the first target pixel and each third subset of pixels being associated with the respective reference pixel.

Subsequently, a weighting function is used to determine weight values for each of the reference pixels based on their respective SAD value. The first target pixel is then modified by the image filter using the determined weight values.

Following the modification of the first target pixel, a second target pixel within in an apply patch is selected for modification. The apply patch being a fourth subset of pixels that includes the first target pixel. The second target pixel is modified using the previously determined weight values from the first target pixel, i.e., weighted values are not computed for the second target pixel within the apply patch. Instead, each of the reference pixels of the search area for the second target pixel will be assigned the previously determined weight values computed for the first target pixel. In particular, the weight values are reassigned to the set of reference pixels associated with the second target pixel based on a relative position of the first target pixel to the second target pixel. For example, if the second target pixel is one pixel to the right of the first target pixel then each of the new set of reference pixels' will be reassigned the weight value from one pixel to the left of it. Thus, in contrast to the modification of the first target pixel, SAD values and weight values do not need to be determined for the modification of the second target pixel. As a result, the image filter has a low level of complexity, processing time can be reduced, especially in software implementations of the image filter, and power consumption is improved.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

DETAILED DESCRIPTION

Figure 1:
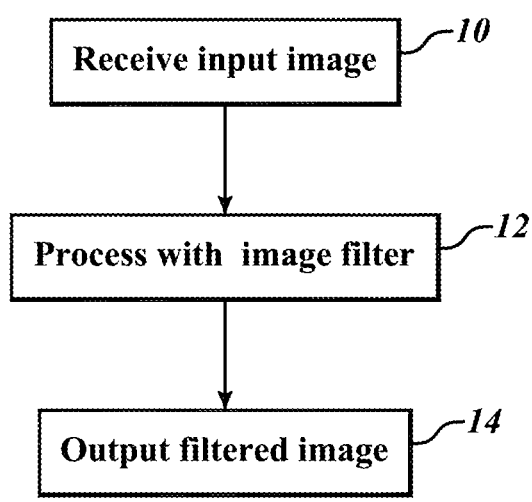
FIG. 1 is a flow diagram illustrating an example of data flow for an optimized image filter according to one embodiment disclosed herein.

In the following description, certain specific details are set forth in order to provide a thorough understanding of various embodiments of the disclosure. However, one skilled in the art will understand that the disclosure may be practiced without these specific details. In some instances, well-known processes associated with digital image processing have not been described in detail to avoid obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Most image filters perform processing pixel-by-pixel and require a significant amount of calculations. Consequently, image filters often consume large amounts processing time or power. High processing times and power consumption are problematic for real-time applications and portable electronic devices. For example, digital cameras obtain and display images to users in real-time. Substantial delays or excessive power consumption results in a poor user experience. Low processing time is especially important for displaying videos in real-time. Many videos produce 720 p images at 30 frames per second or even 4 k images at 60 frames per second. Any delay in the video will be noticeable to users.

Figure 3:
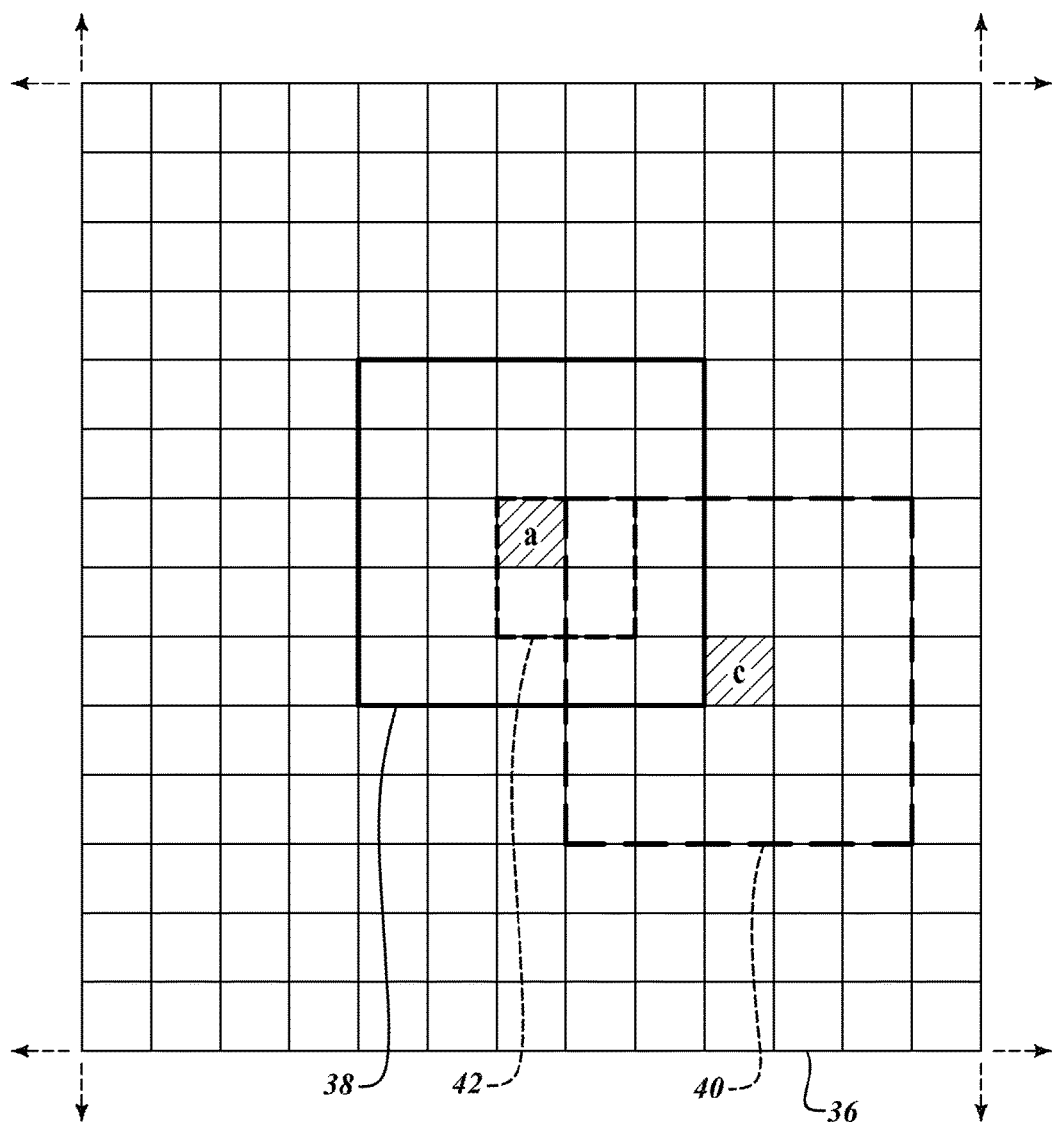
FIG. 3 is a diagram illustrating an example of modifying a first pixel of an apply patch according to one embodiment disclosed herein.
Figure 4:
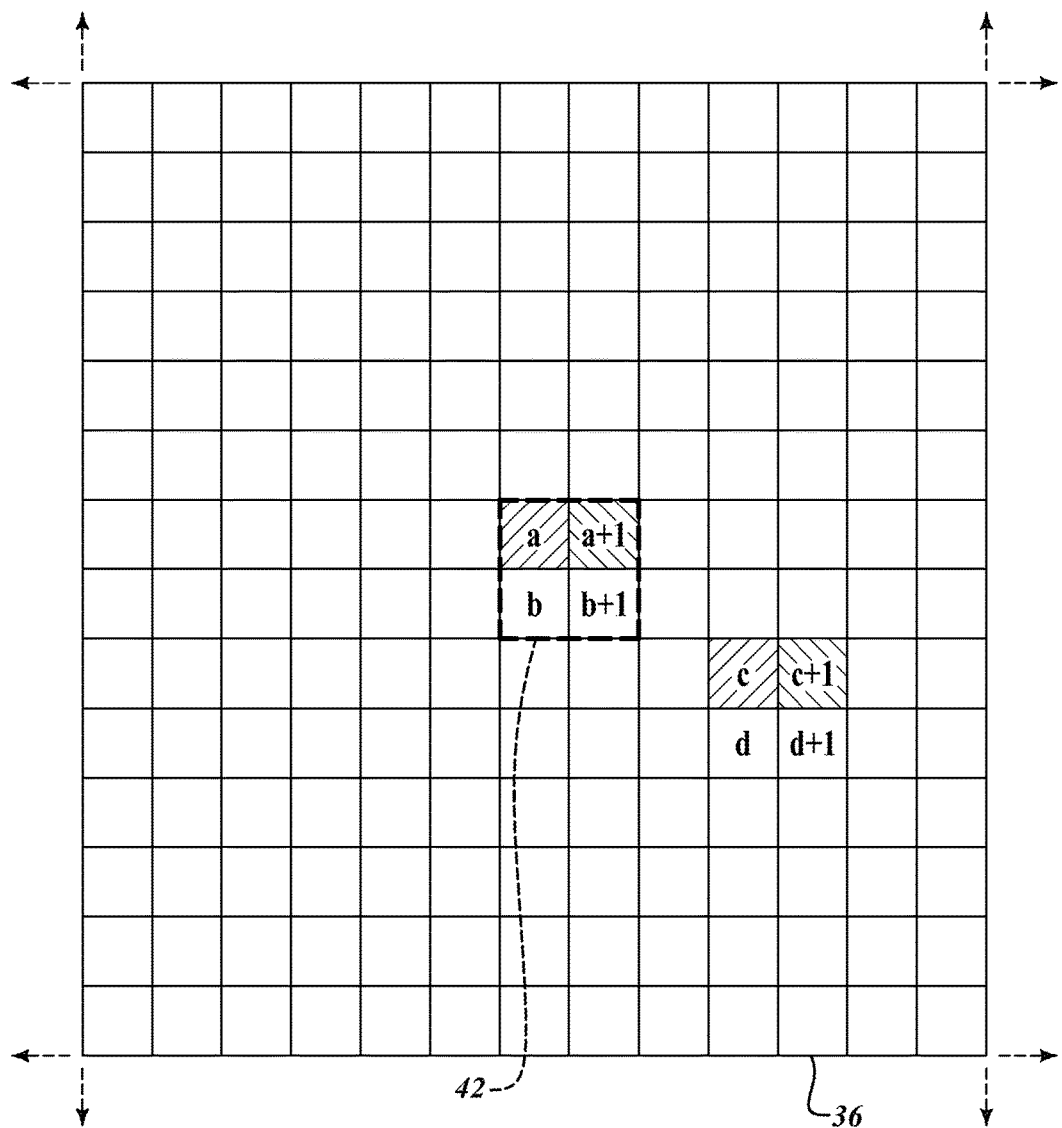
FIG. 4 is a diagram illustrating an example of modifying a second pixel of the apply patch of FIG. 3 according to one embodiment disclosed herein.

Acceleration techniques are often used to lower the complexity of image filters, and improve processing time and power consumption. A common acceleration technique is to lower the size of a search area, such as the search area $\Omega$, of an image, or lowering the size of pixels subsets, such as a target patch 38, used for difference calculations. FIG. 3 illustrates a search area 36, which is a portion of the overall image that is used for processing, and the target patch 38. Lowering the size of the search area or the target patch, however, also reduces the efficiency of the technique and may impact image sharpness and resolution. Particularly, lowering the size of the search area prevents the removal of lower frequency noise and reduces the ability to find acceptable matching areas, and lowering the size of target patch increases the number of false matching areas. Another common acceleration technique is to use a relatively simple difference calculation for non-local filters. Using a simpler difference calculation has been proven to provide good results; however, the complexity is still too high, and further complexity reduction is advantageous.

The present disclosure is directed to an image filter that reduces complexity by reducing a total amount of calculations used for a weighting function of the image filter. In particular, the image filter determines weight values for a selected target pixel a in FIG. 3, and then reuses the determined weight values for other target pixels a+1, b, b+1. By reusing previously determined weight values for multiple target pixels, the complexity level of the image filter is reduced and processing time and power consumption is improved. The processing of the image filter will be discussed in further detail with respect to FIGS. 1-6.

FIG. 1 is a flow diagram illustrating an example of data flow for an image filter according to one embodiment disclosed herein.

At a first part of the sequence 10, an input image is obtained for digital image processing. The input image may be a single image or may be single frame of a stream of input images, such as a video. The input image may be obtained from a variety of sources, such as an image sensor, a multimedia content provider, memory, and a world wide web.

In a subsequent step 12, the input image is provided to the image filter for processing. For example, the image filter may modify the input image to digitally reduce noise present in the input image and produce a final image for a user. Processing for the image filter will be discussed in further detail with respect to FIGS. 2-6.

In step 14, the image filter has completed processing and a filtered image is obtained. Although not shown, the data flow of FIG. 1 may be repeated for multiple images. For example, the data flow of FIG. 1 may be repeated for real-time processing of multiple images or a stream of input images, such as a video.

Figure 2:
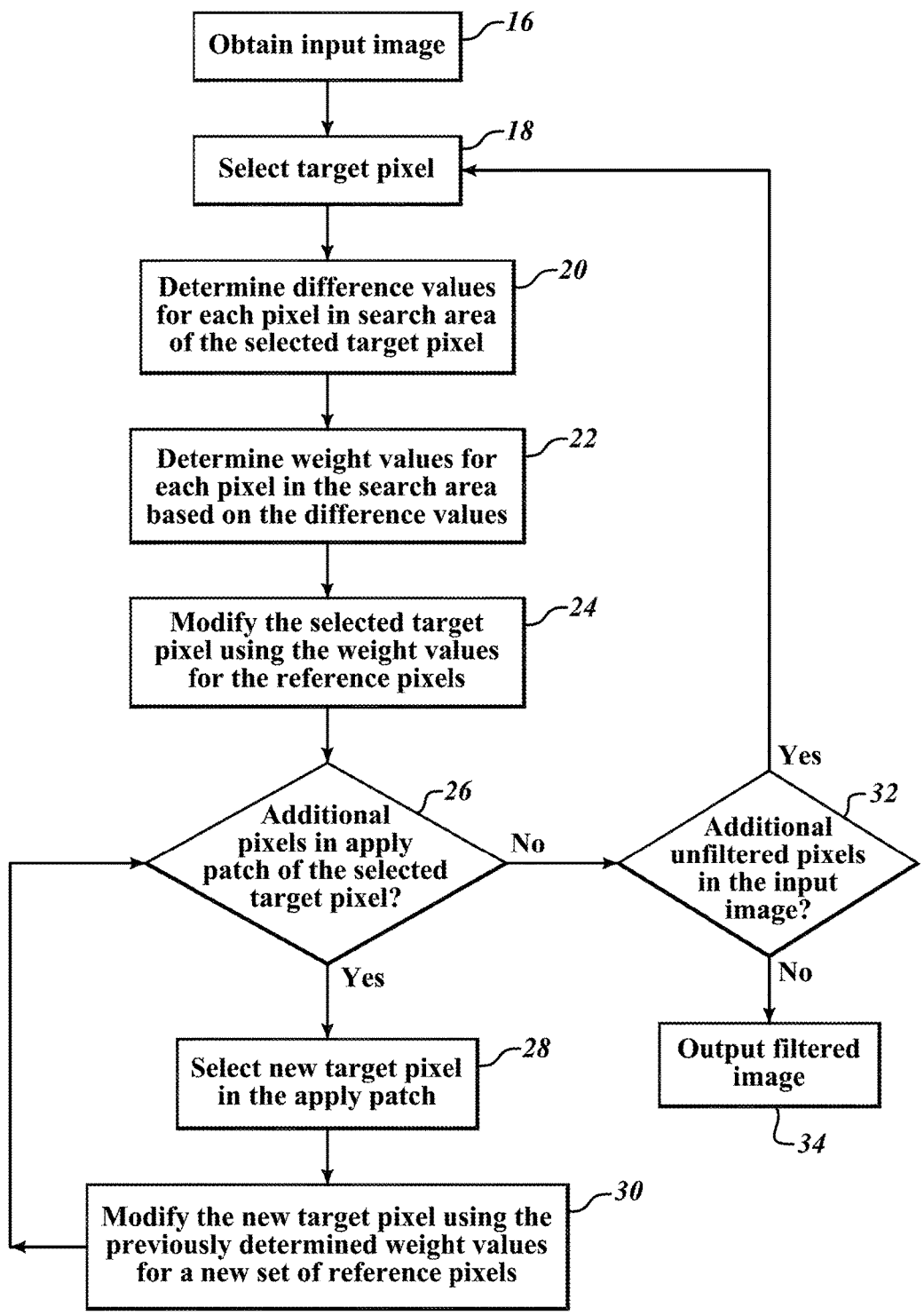
FIG. 2 is a flow diagram illustrating an example of processing for an optimized image filter according to an embodiment disclosed herein.

FIG. 2 is a flow diagram illustrating an example of processing for an image filter according to an embodiment disclosed herein. It is beneficial to review the steps of FIG. 2 simultaneously with FIGS. 3-6, which are diagrams illustrating examples of modifying pixels of an apply patch according to one embodiment disclosed herein.

At a first part of the sequence 16, the image filter obtains an input image. As previously discussed, the input image may be a single image or may be single frame of a stream of input images, such as a video.

In a subsequent step 18, a target pixel is selected for modification. For example, referring to FIG. 3, a target pixel a is selected. To process the entire image, multiple target pixels are processed sequentially. Target pixels may be selected at random, by row, by column, or in any predetermined order. For example, target pixels may be selected by starting at an upper left corner of the input image, selecting pixels of a first row from left to right, moving to the next row, and then continue this pattern until reaching a lower right corner of the input image. In an alternative embodiment, every other pixel of the input image is selected as a target pixel.

The selected target pixel has a corresponding search area, target patch, reference patch, and apply patch. For example, referring to FIG. 3, the target pixel a has a corresponding search area 36, a target patch 38, a reference patch 40, and an apply patch 42. The patches are subsets of pixels within the search area 36.

The search area includes reference pixels that surround the selected target pixel. The reference pixels are used for modification of the target pixel. For example, referring to FIG. 3, the target pixel a may be modified by replacing its value with a weighted average of the reference pixels of the search area 36 for noise reduction. As will be discussed with respect to steps 20 and 22, the weights of the reference pixels are based on a distance or difference calculation, such as a sum of absolute differences (SAD) or sum of squared differences (SSD).

The target patch 38 and the reference patch 40 have the same dimensions and are used to determine a similarity between the selected target pixel and a reference pixel. The similarity between the target pixel and the reference pixel may be computed as a difference value, as each pixel may have a numerical representation and the similarity is a comparison of the numerical representation of each pixel. This can also be referred to as a distance between the target pixel's value and the reference pixel's value, where the distance is not necessarily representative of the physical space between the pixels in the array.

In a preferred embodiment, the target patch and the reference patch are centered on the target pixel and the reference pixel, respectively. For example, referring to FIG. 3, the target patch 38 and the reference patch 40 are used to determine a difference value between the target pixel a and a reference pixel c. Each of the reference pixels within the search area 36 will be used to create a difference value with respect to the target pixel. Accordingly, as each reference pixel in the search area is processed, a reference patch 40 will be associated with the reference pixel being processed. The determination of difference values will be discussed in further detail with respect to step 20.

The apply patch 42 includes the target pixel a and is a subset of the target patch 38. The apply patch includes additional target pixels a+1, b, b+1 that are modified using previously determined weight values from the target pixel a. The apply patch will be discussed in further detail with respect to steps 26-30.

In step 20, difference values are determined between the selected target pixel and each of the reference pixels of the search area. A difference value between a first pixel (the target pixel a) and a second pixel (reference pixel c) is determined by comparing pixels in a first patch centered on the first pixel (the target patch 38) and respective corresponding pixels in a second patch centered on the second pixel (reference patch 40). The difference values may be determined using a calculation, such as SAD or SSD. SAD and SSD calculations are well known in the art and will not be discussed in detail in this description.

For example, referring to FIG. 3, a difference or distance between the target pixel a value and the reference pixel c value is determined by calculating a difference value between the target patch 38 centered on the target pixel a and the reference patch 40 centered on the reference pixel c. Difference values are determined between the target pixel a and each reference pixel in the search area 36.

It should be noted that the dimensions of the search area 36, the target patch 38, and the reference patch 40 shown in FIGS. 3-6 are for illustrative purposes. The search area 36, the target patch 38, and the surrounding patch 40 may have any size. In a preferred embodiment, the search area is larger than the target patch.

In other words, once the target pixel a is identified and the target patch 38 is identified, then a reference pixel is selected, such as reference pixel c in FIG. 3. A reference patch is identified that corresponds to reference pixel c, for example, reference patch 40. The target patch 38 and the reference patch 40 have the same dimension, i.e. include the same number of pixels in the same shape. In FIG. 3, the target patch and the reference patch are both 5×5 arrays of pixels. Then, each pixel of the target patch is compared to each pixel of the reference patch and then a single value is calculated to generate the difference value.

In step 22, a weighting function is used to determine weight values for each of the reference pixels of the search area based on their respective difference value between the selected target pixel determined in step 20. For example, referring to FIG. 3, a weight value is determined for the reference pixel c based on its determined difference value between the target pixel a from step 20. Weight values are determined for each reference pixel of the search area 36. In a preferred embodiment, a weight value for a reference pixel is inversely related to its determined difference value. That is, reference pixels that are similar to the selected target pixel (i.e., smaller difference values) are given larger weight values, and vice versa.

In order to determine the weight value for every pixel in the search area 36 when processing for target pixel a, the comparison and determination of distances values as done for the reference pixel c above, is performed for every pixel in the search area.

In step 24, the selected target pixel is modified by the image filter using the weight values computed in step 22. For example, referring to FIG. 3, the target pixel a may be modified by replacing its value with a weighted average of the reference pixels of the search area 36 for noise reduction. The image filter may be any type of filter that utilizes a weighting function based on the difference between a target pixel value and reference pixel values.

In step 26, it is determined whether there are additional pixels in the apply patch 42 associated the selected target pixel a. For example, it is determined whether the apply patch 42 includes additional pixels besides the target pixel a. If there are no additional pixels in the apply patch, the processing moves to step 32. If there are additional pixels in the apply patch, the processing moves to step 28.

It should be noted that the dimensions and pattern of the apply patch 42 shown in FIGS. 3-6 are for illustrative purposes. An apply patch may include any number of pixels that are part of a target patch. For example, the apply patch 42 may include any number of pixels of the target patch 38. In one embodiment, the apply patch has a plus pattern consisting of the selected target pixel and pixels immediately to the right, left, above, and below the selected target pixel. In another embodiment, the apply patch is a 3×3 patch centered on the selected target pixel. In a further embodiment, the apply patch consists of the same pixels as the target patch. In an even further embodiment, the apply patch consists two consecutive pixels, such as pixels a and a+1.

In step 28, a second target pixel in the apply patch is selected for modification. For example, referring to FIG. 4, the second target pixel a+1 in the apply patch 42 is selected. The second target pixel in the apply patch may be selected at random, by row, by column, or in any predetermined order.

In step 30, the second target pixel is modified using the previously determined weight values for the original target pixel. The second target pixel is associated with a second set of reference pixels. The difference value between the original target patch and the original reference patch is considered to be a valid difference value between all pixels of the target patch and corresponding pixels of the reference patch. For example, referring to FIG. 4, a difference value between a target patch centered on pixel a and a reference patch centered on pixel c is also considered to be a valid difference value between pixel a+1 and pixel c+1. Accordingly, when modifying the second target pixel in the apply patch 42, weight values that were determined in step 22 may be reused for the second set of reference pixels.

Figure 5:
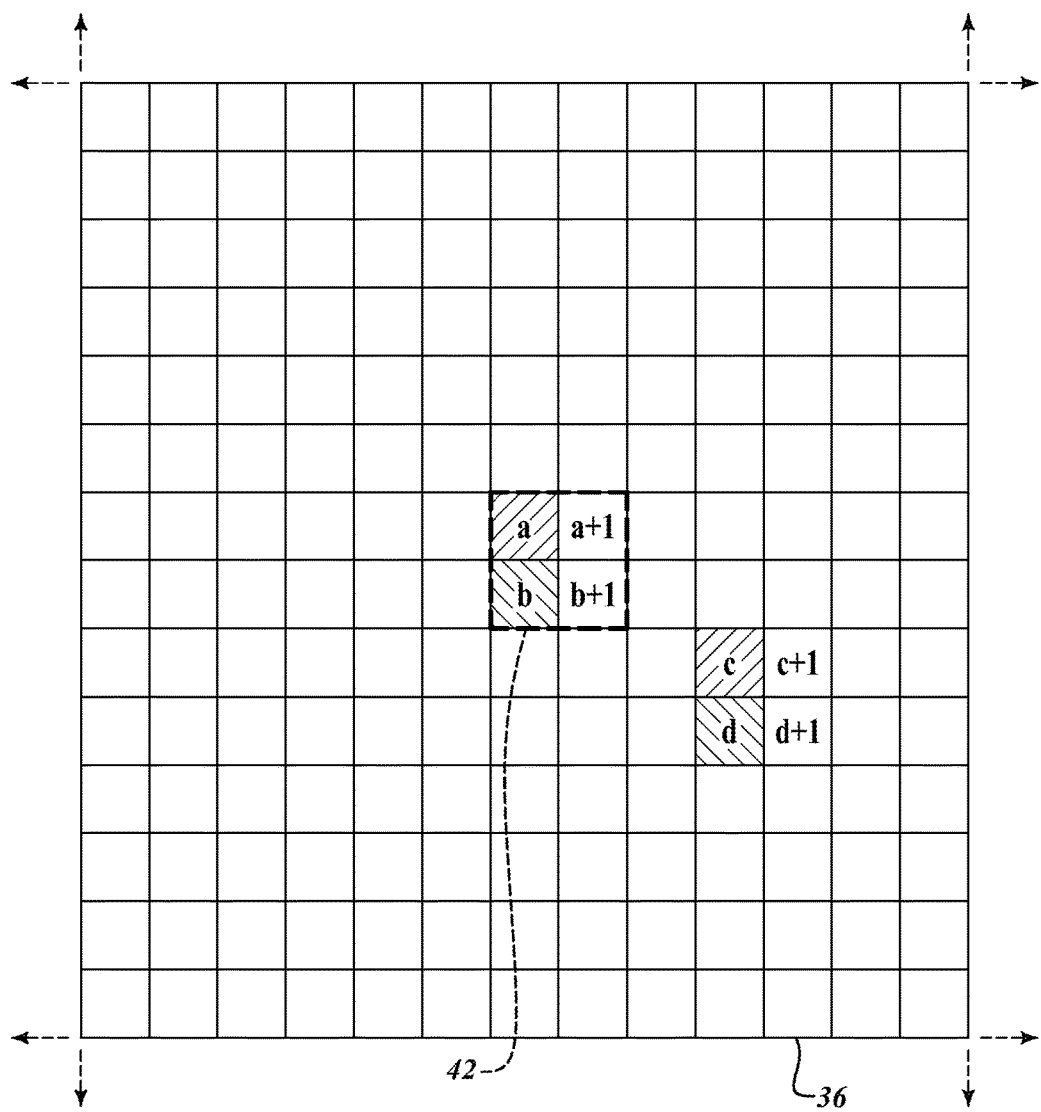
FIG. 5 is a diagram illustrating an example of modifying a third pixel of the apply patch of FIG. 3 according to one embodiment disclosed herein.
Figure 6:
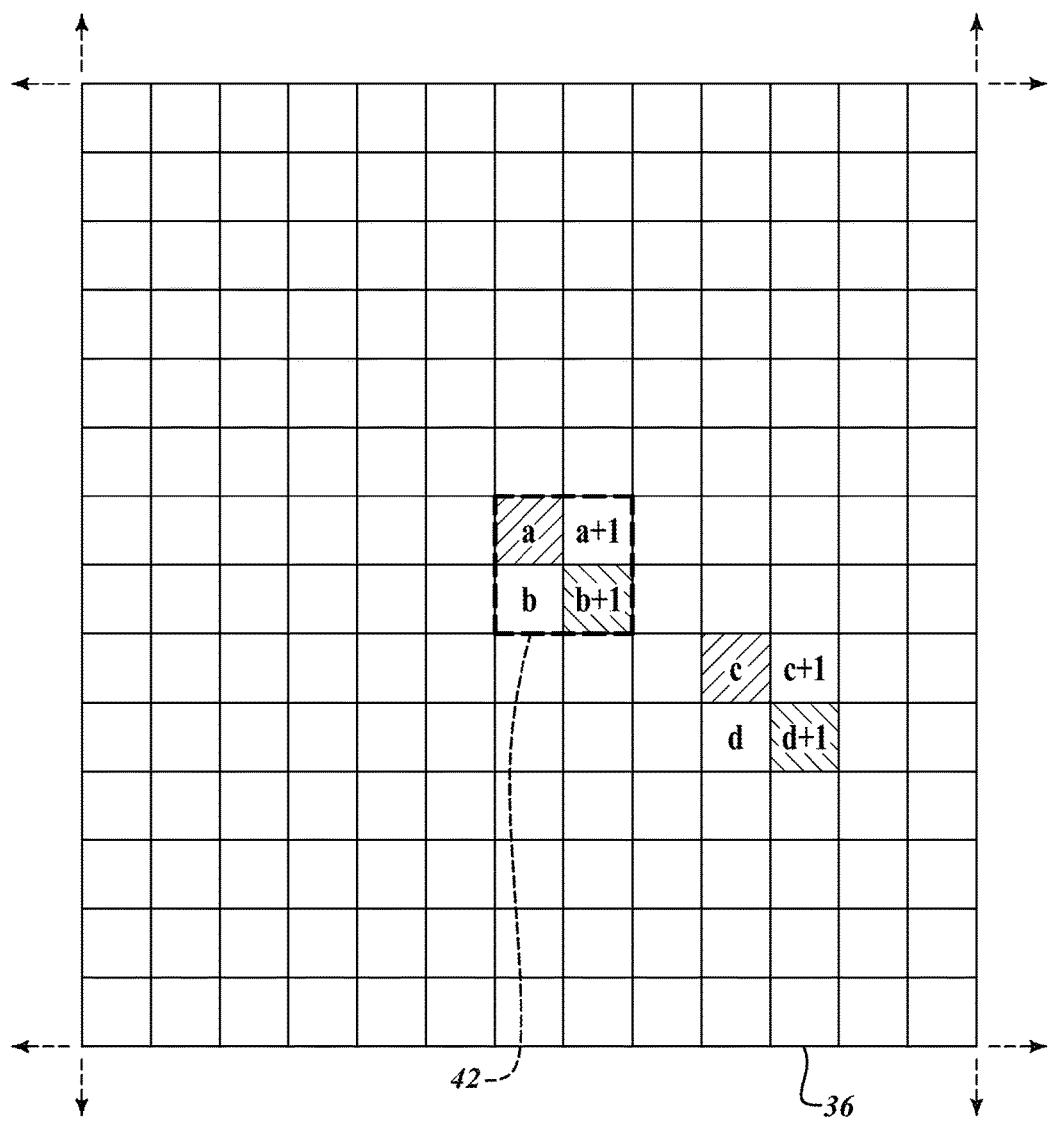
FIG. 6 is a diagram illustrating an example of modifying a fourth pixel of the apply patch of FIG. 3 according to one embodiment disclosed herein.

The previously determined weight values in step 22 are reused for the second set of reference pixels based on the second target pixel's position relative to the original target pixel from step 18. In particular, each of previously determined weight values from the original reference pixels is assigned to an adjacent one of the reference pixel (the second set of reference pixels). A position of the second reference pixel relative to the original reference pixel is the same as a position of the second target pixel relative to the original target pixel. In other words, the previously determined weight values are shifted to the second set of reference pixels by the same direction and distance as the second target pixel is shifted from the original target pixel. For example, referring to FIG. 4, when the selected target pixel is pixel a and the new target pixel is pixel a+1, the weight value corresponding to the reference pixel c is shifted and assigned to reference pixel c+1. Similarly, the weight value corresponding to the reference pixel c is assigned to reference pixel d when the selected target pixel is pixel a and the new target pixel is pixel b, as shown in FIG. 5; and the weight value corresponding to the reference pixel c is assigned to reference pixel d+1 when the selected target pixel is pixel a and the new target pixel is pixel b+1, as shown in FIG. 6.

The second target pixel is then modified with the previously determined weight values assigned to the second set of reference pixels. For example, similar to step 24, the second target pixel may be modified by replacing its value with a weighted average of the second set of reference pixels for noise reduction. Therefore, in contrast to the modification of the target pixel in steps 20-24, difference values and weight values do not need to be determined for the modification of the second target pixel.

By reusing previously determined weight values, it is possible to divide the input image in to a plurality of apply patches and use the same weight values for all pixels belonging to the same apply patch. Using the same weight values for each pixel of an apply patch reduces the total amount of calculations for the weighting function of the image filter. For example, referring to FIGS. 4-6, reusing the determined weight values for target pixel a for pixels a+1, b, and b+1 leads to a reduction factor of four. Similarly, a 3×3 apply patch leads to a reduction factor of nine, and a 2×1 patch leads to a reduction factor of two. Accordingly, a level of optimization may be adjusted by controlling the size of the apply patch.

Subsequent to step 30, the processing returns to step 26 to determine whether there are additional pixels in the apply patch of the selected target pixel. As such, steps 28-30 are repeated until each pixel in the apply patch has been modified. For example, steps 28-30 are repeated until pixels a+1, b, and b+1 have been modified by the optimized image filter.

In an alternative embodiment, the previously determined difference values are reused, instead of the weight values in step 30. As previously discussed, a difference value between a target patch and a reference patch is considered to be a valid difference value for all pixels of the target patch and respective corresponding pixels of the reference patch. Accordingly, similar to the reusing of the previously determined weight values, each of the previously determined difference values determined in step 20 is used for a new reference pixel such that a position of the new reference pixel relative to the reference pixel corresponding to the previously determined difference value is the same as a position of the new target pixel relative to the selected target pixel. In other words, the previously determined difference values are shifted to a new set of reference pixels by the same direction and difference value as the new target pixel is shifted from the selected target pixel. For example, referring to FIG. 4, when the selected target pixel is pixel a and the new target pixel is pixel a+1, the difference value that was determined between pixel a and reference pixel c is reused as a difference value between pixel a+1 and pixel c+1. By reusing the previously determined difference values, instead of the previously determined weight values, a new weighting function may be used in step 30 to determine a new weight values for the new set of reference pixels, similar to step 22. The new target pixel may then be modified using the new weight values, similar to step 24.

Returning to step 26, if there are no additional pixels in the apply patch of the selected target pixel, the processing moves to step 32. In step 32, it is determined whether there are additional pixels in the input image that have not been filtered by the image filter. If there are additional unfiltered image pixels in the input image, the processing returns to step 18. If there are no additional unfiltered pixels in the input image, the processing moves to step 34.

In step 34, the image filter has completed processing and the filtered image is provided.

It should be noted that each block shown in FIGS. 1-2 may represent one or more blocks as appropriate to a specific embodiment or may be combined with other blocks.

Figure 7:
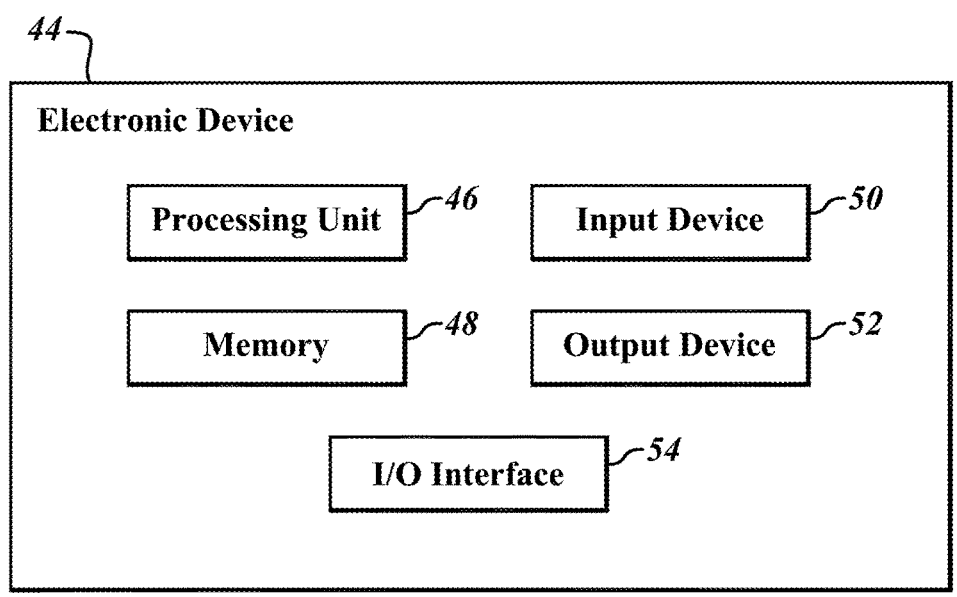
FIG. 7 is a schematic illustrating an example of an electronic device for implementing an optimized image filter according to one embodiment disclosed herein.

FIG. 7 is a schematic illustrating an example of an electronic device 44 for implementing an optimized image filter according to one embodiment disclosed herein. Non-limiting examples of the electronic device 44 include a digital camera, a mobile telephone, a gaming device, a computer, a tablet, a television, or a set-top box. In one embodiment, the electronic device 44 includes a processing unit 46, a memory 48, an input device 50, an output device 52, and an I/O interface 54. It should be noted that the electronic device 44 may include additional functionalities and components than those illustrated in FIG. 7.

The processing unit 46 is configured to perform the processing for the optimized image filter. In one embodiment, the processing unit 46 is a digital signal processor. The memory 48 may be a non-volatile memory, such as ROM, a volatile memory, such as RAM, or a combination thereof. In one embodiment, the optimized image filter is implemented in software and is stored in the memory 48. The input device 50 and the output device 52 may include devices used by a user to interact with the electronic device 44. Non-limiting examples of the input device 50 include a sensor, such as a CMOS or CCD sensor, of a digital camera; a keyboard; a mouse; buttons; and a touch screen. Non-limiting examples of the output device 52 include a display, a television, a computer monitor, and speakers. The I/O interface 54 is configured to send and receive data. For example, the I/O interface 54 may be coupled to a satellite antenna, a world wide web, or an external electronic device to send and receive multimedia content.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors, digital signal processors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms of taught herein are capable of being distributed as a program product in a variety of forms, and that an illustrative embodiment applies equally regardless of the particular type of physical signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary to employ concepts of the various patents, applications and publications to provide yet further embodiments.

It will be appreciated that, although specific embodiments of the present disclosure are described herein for purposes of illustration, various modifications may be made without departing from the spirit and scope of the present disclosure. Accordingly, the present disclosure is not limited except as by the appended claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an image sensor that in operation:
   captures an image having a plurality of pixels; and
a processor coupled to the image sensor to filter the image, the processor in operation:
   selects an apply patch of the image, the apply patch including first and second pixels of the plurality of pixels;
   selects a search area of the image, the search area including at least a third pixel of the plurality of pixels;
   determines a difference value between the first pixel and the third pixel based on the pixels surrounding the first pixel and the third pixel;
   determines a weight value based on the difference value;
   assigns the weight value to the third pixel;
   modifies the first pixel with the weight value assigned to the third pixel;
   selects a fourth pixel, the fourth pixel being adjacent to the third pixel;
   assigns the weight value to the fourth pixel; and
   modifies the second pixel with the weight value assigned to the fourth pixel.

2. The device of claim 1 wherein the processor in operation selects the second pixel to be immediately adjacent to the first pixel.

3. The device of claim 1 wherein the processor in operation selects the fourth pixel such that a position of the fourth pixel in the image relative to the third pixel is the same as a position of the second pixel in the image relative to the first pixel.

4. The device of claim 1 wherein the processor includes a finite impulse response filter that determines the weight value.

5. A method, comprising:
filtering an image having a plurality of pixels, the filtering including:
   selecting a first target pixel in a first target area, the first target area including a first number of pixels of the plurality of pixels;
   selecting a first reference pixel in a first reference area, the first reference area including the first number of pixels of the plurality of pixels;
   determining difference values for each pixel in the first reference area with respect to the first target area;
   determining weight values for each pixel in the first reference area based on the difference values;
   modifying the first target pixel with the weight values from each pixel in the first reference area; and
   modifying a second target pixel in the first target area with the weight values.

6. The method of claim 5 wherein the filtering includes modifying a third target pixel and a fourth target pixel in the first target area with the weight values.

7. The method of claim 6 wherein the first and second target pixels are adjacent to each other and the third and fourth target pixels being adjacent to each other and the second and third target pixels are adjacent to each other.

8. The method of claim 5 wherein the first target area overlaps and shares some pixels with the first reference area.

9. A method, comprising:
filtering an image by:
   selecting an apply patch of the image, the apply patch including first and second pixels of the plurality of pixels, the second pixel being adjacent to the first pixel;
   selecting a search area of the image, the search area including at least a third pixel of the plurality of pixels;
   determining a difference value between the first pixel and the third pixel based on the pixels surrounding the first pixel and the third pixel;
   determining a weight value based on the difference value;
   modifying the first pixel with the weight value; and
   modifying the second pixel with the weight value.

10. The method of claim 9 wherein filtering the image includes modifying a fourth pixel and a fifth pixel in the apply patch with the weight value.

11. The method of claim 10 wherein the fourth pixel and fifth pixels are adjacent to each other and adjacent to the first and second pixels.

12. The method of claim 9 wherein the determining of the weight value includes setting the weight value to a value that is inversely related to the difference value.

13. The method of claim 9, further comprising selecting a target patch that includes the apply patch, selecting a reference patch that includes the third pixel, and determining the difference value from the pixels in the target patch and the reference patch.

14. The method of claim 9 wherein determining the difference value includes using a sum of absolute differences or a sum of squared differences.

* * * * *